Patented July 18, 1933

1,918,804

UNITED STATES PATENT OFFICE

WILLIAM HOWLETT GARDNER, OF NEW YORK, N. Y., ASSIGNOR TO UNITED STATES SHELLAC IMPORTERS' ASSOCIATION, INC., OF NEW YORK, N. Y., A CORPORATION OF NEW YORK

SHELLAC-PIGMENT COMPOSITION

No Drawing. Application filed October 10, 1930. Serial No. 487,914.

This invention relates to a shellac-pigment composition, comprising shellac, solvent, a metallic pigment and an agent or agents which serve to maintain the composition fluid, as, for example, an agent which prevents the formation or existence of metal soaps of shellac or which retard such formation.

When a basic oxide such as zinc oxide is added to a shellac solution in the preparation of a white shellac paint, it will be noted that after a few hours the paint becomes very viscous, and in a short time the whole may become solid. Similar behavior is encountered when metals such as aluminum are incorporated in bleached shellac solutions. Here distinct corrosion appears to transpire with evolution of gas, which sometimes forces the lid from the can or the cork from the bottle.

I have proceeded on evidence that the solidification of the said compounds is due to the formation of metal salts or soaps of shellac, this formation probably being influenced by the acidity of shellac solutions. These soaps show adhesive and gelatinous characteristics and have a tendency to coat the pigment particles and thereby impart a gelatinous or solid structure to either the settled pigment or to the composition as a whole. My composition is characterized by the presence of one or more agents which are antagonistic to the formation of metallic soaps or which effect decomposition of said soaps when formed. Said agent is preferably malic acid.

As examples, the compound may comprise the following:

| | Grams |
|---|---|
| I. Commercial bleached shellac solution | 25 |
| Zinc oxide | 3 |
| II. Commercial bleached shellac solution | 25 |
| Copper oxide | 3 |
| III. Commercial bleached shellac solution | 25 |
| Mercuric oxide | 3 to 9 |
| IV. Commercial bleached shellac solution | 25 |
| Aluminium | 3 |
| V. Commercial bleached shellac solution | 25 |
| Copper | 3 |
| Malic acid | 1.5 |
| VI. Commercial bleached shellac solution | 25 |
| Brass | 3 |
| Malic acid | 1.5 |
| or Citric acid | 1.5 |
| or Tartaric acid | 1.5 |
| VII. Commercial bleached shellac solution | 25 |
| Lead | 3 |
| Malic acid | 1.5 |

That the malic acid in the compound effects decomposition of shellac soaps is shown by the formation of crystalline maleates. This may be demonstrated by preparing metal soaps of bleached shellac as, for example, zinc, copper, mercury and aluminum soaps by the method of Whitmore and Lauro and comparing reactions when one sample of each soap is suspended in alcohol; one in a shellac solution; and one in a solution of malic acid. The Whitmore and Lauro method consists briefly in neutralizing an alcoholic solution of shellac with potassium hydroxide, adding water, boiling off most of the alcohol, and precipitating the insoluble shellac soaps with a suitable solution of the metal. The soaps were filtered and air dried. Each soap was then treated in the following manner.

1. Suspended in pure alcohol.
2. Suspended in a shellac solution.
3. Treated with an alcoholic solution of malic acid.

In all suspensions in alcohol the soaps showed a slight tendency to decompose or dissolve in alcohol, and with the exception of the mercury soap settled to the bottom giving a solid mass. Similar behavior was noted in the shellac solutions. In the malic acid solution the shellac soaps were decomposed liberating free shellac. With copper and zinc soaps the crystals of the salts of malic acid were observed, i. e.;

Cu Shellacate + Malic acid =
  Cu Maleate + Shellac
Cu Shellac + H Malic = Cu Mal. + H Shellac A study of the solubility of shellac soaps revealed that the copper and zinc soaps were soluble in organic bases such as pyridine or aniline.

Shellac paints made in accordance with the method, particularly when agents are added to increase flexibility, have a wide field of use including leather finishing, fabric impregnation and coating, and treatment of paper. They have excellent adhesive properties, fill pores and surface imperfections, and have excellent covering power.

Having described my invention, what I claim and desire to secure by Letters Patent is as follows:—

1. A shellac-pigment composition comprising shellac, shellac solvent, metallic pigment and malic acid.

2. A shellac-pigment composition comprising shellac, shellac solvent, metallic pigment and malic acid, the acid being from .03% to .5% of the metallic pigment.

WILLIAM HOWLETT GARDNER.